US010385223B2

(12) United States Patent
Oki et al.

(10) Patent No.: US 10,385,223 B2
(45) Date of Patent: Aug. 20, 2019

(54) INK JET TEXTILE PRINTING PENETRANT AND INK JET RECORDING APPARATUS

(71) Applicant: Seiko Epson Corporation, Tokyo (JP)

(72) Inventors: Yasuhiro Oki, Matsumoto (JP); Hidehiko Komatsu, Chino (JP)

(73) Assignee: Seiko Epson Corporation (JP)

( * ) Notice: Subject to any disclaimer, the term of this patent is extended or adjusted under 35 U.S.C. 154(b) by 164 days.

(21) Appl. No.: 15/212,519

(22) Filed: Jul. 18, 2016

(65) Prior Publication Data

US 2017/0029636 A1 Feb. 2, 2017

(30) Foreign Application Priority Data

Jul. 28, 2015 (JP) .................. 2015-148867

(51) Int. Cl.
| | |
|---|---|
| C09D 11/033 | (2014.01) |
| C09D 11/36 | (2014.01) |
| C09D 11/38 | (2014.01) |
| C09D 11/54 | (2014.01) |
| B41J 2/01 | (2006.01) |
| B41J 3/407 | (2006.01) |
| D06P 1/46 | (2006.01) |
| D06P 1/62 | (2006.01) |
| D06P 1/647 | (2006.01) |
| D06P 5/20 | (2006.01) |
| D06P 5/30 | (2006.01) |
| D06P 1/48 | (2006.01) |
| D06P 1/50 | (2006.01) |
| D06P 1/52 | (2006.01) |
| D06P 1/613 | (2006.01) |
| D06P 1/673 | (2006.01) |

(52) U.S. Cl.
CPC .............. *C09D 11/033* (2013.01); *B41J 2/01* (2013.01); *B41J 3/4078* (2013.01); *C09D 11/36* (2013.01); *C09D 11/38* (2013.01); *C09D 11/54* (2013.01); *D06P 1/46* (2013.01); *D06P 1/48* (2013.01); *D06P 1/50* (2013.01); *D06P 1/525* (2013.01); *D06P 1/5228* (2013.01); *D06P 1/5257* (2013.01); *D06P 1/613* (2013.01); *D06P 1/625* (2013.01); *D06P 1/6735* (2013.01); *D06P 5/2072* (2013.01); *D06P 5/2077* (2013.01); *D06P 5/30* (2013.01)

(58) Field of Classification Search
CPC ....... C09D 11/033; C09D 11/36; C09D 11/38; C09D 11/54; B41J 2/01; B41J 3/4078; D06P 1/46; D06P 1/625; D06P 1/647; D06P 5/2072; D06P 5/2077; D06P 5/30
USPC ......... 106/31.13, 31.27, 31.43, 31.57, 31.58, 106/31.6, 31.75, 31.85, 31.86
See application file for complete search history.

(56) References Cited

U.S. PATENT DOCUMENTS

| | | | | |
|---|---|---|---|---|
| 6,447,592 | B1 | 9/2002 | Taniguchi | |
| 7,083,669 | B2* | 8/2006 | Fukumoto | C09D 11/38 106/31.58 |
| 7,211,132 | B2* | 5/2007 | Oki | C09D 11/328 106/31.58 |
| 7,276,111 | B2* | 10/2007 | Oki | C09D 11/32 106/31.58 |
| 7,279,034 | B2* | 10/2007 | Oki | C09D 11/328 106/31.58 |
| 7,303,616 | B2* | 12/2007 | Oki | C09D 11/328 106/31.58 |
| 7,691,192 | B2* | 4/2010 | Oki | C09D 11/328 106/31.49 |
| 7,824,025 | B2 | 11/2010 | Ohira | |
| 7,871,465 | B2* | 1/2011 | Hanmura | C09D 11/38 106/31.58 |
| 8,778,072 | B2* | 7/2014 | Iseki | C09D 11/38 106/31.58 |
| 8,857,965 | B2* | 10/2014 | Ikeda | C09D 11/38 347/100 |
| 8,876,273 | B2* | 11/2014 | Ikeda | C09D 11/38 347/100 |
| 2007/0263055 | A1* | 11/2007 | Kitamura | C09B 67/0033 106/31.43 |
| 2010/0293725 | A1 | 11/2010 | Hermann | |
| 2012/0327156 | A1 | 12/2012 | Aruga et al. | |
| 2013/0202861 | A1 | 8/2013 | Ohta | |
| 2016/0230334 | A1 | 8/2016 | Oki et al. | |

FOREIGN PATENT DOCUMENTS

| | | | |
|---|---|---|---|
| EP | 1035248 | A2 | 9/2000 |
| EP | 2527412 | A2 | 11/2012 |
| EP | 3053972 | A1 | 8/2016 |
| JP | 2000-327976 | A | 11/2000 |
| JP | 2002-012800 | A | 1/2002 |
| JP | 2004-143621 | A | 5/2004 |
| JP | 2007-238798 | A | 9/2007 |
| JP | 2007-276238 | A | 10/2007 |

(Continued)

OTHER PUBLICATIONS

Extended European Search Report for Patent Application No. EP 16181254.0 dated Feb. 28, 2017 (14 pages).

(Continued)

*Primary Examiner* — Helene Klemanski

(74) *Attorney, Agent, or Firm* — Harness, Dickey & Pierce, P.L.C.

(57) ABSTRACT

An ink jet textile printing penetrant includes a water-soluble organic solvent; a surfactant; and one type or two or more types selected from the group consisting of a chelating agent and an aromatic compound.

10 Claims, No Drawings

(56) References Cited

FOREIGN PATENT DOCUMENTS

| JP | 2011-174007 A | 9/2011 |
| JP | 2012-153754 A | 8/2012 |
| JP | 2012-167394 A | 9/2012 |
| JP | 2013-136649 A | 7/2013 |
| JP | 2013-221141 A | 10/2013 |
| JP | 2016-141802 A | 8/2016 |
| WO | WO-2012-130492 A1 | 10/2012 |

OTHER PUBLICATIONS

Partial European Search Report for Patent Application No. EP16181254.0 dated Nov. 4, 2016 (7 pages).

\* cited by examiner

INK JET TEXTILE PRINTING PENETRANT AND INK JET RECORDING APPARATUS

BACKGROUND

1. Technical Field

The present invention relates to an ink jet textile printing penetrant and an ink jet recording apparatus.

2. Related Art

With ink jet recording methods, it is possible to record images with high precision using a comparatively simple apparatus and the ink jet recording methods have been rapidly developed in various fields. Within these methods, various studies have been carried out regarding obtaining recorded matter with high quality in a more stable manner.

For example, JP-A-2011-174007 discloses an ink cartridge which is able to obtain high reliability and high printing quality in a stable manner for long periods not only in an initial state where ink is filled in or is in contact with an ink storing chamber or an ink flow channel of the ink cartridge, but also in cases where there is a change in temperature or where time passes. Furthermore, for the ink cartridge disclosed in JP-A-2011-174007, the resin material options are widened and the use of an inexpensive reflection type ink detection sensor is possible. As a result, with the object of providing an inexpensive ink cartridge and ink jet recording apparatus with high reliability, JP-A-2011-174007 discloses an ink cartridge having an ink storing chamber, which stores ink for ink jet recording, and being mounted on an ink jet recording apparatus so as to be able to be freely attached and detached in which the resin material which forms the ink storing chamber contains a crystallization nucleating agent and the ink for ink jet recording has a conductivity of 3 mS/cm to 10 mS/cm.

The ink cartridge or ink flow channel described in JP-A-2011-174007 is able to comparatively stably hold ink in a state where the ink is in contact with the inner walls thereof; however, it is difficult to form all of the constituent members of the inner walls with which the ink is contact in the ink cartridge or the like of a specific material. This is because the material of each of the constituent members of the ink cartridge or the like is also selected according to an object other than the storage property of ink (an object of satisfying characteristics such as hardness, shape, sealing properties, and gas barrier properties). In addition, in a case where ink jet textile printing penetrants in the related art are used for cartridges or the like of an ink jet apparatus, it is not possible to obtain excellent discharge stability due to foreign matter eluting from a portion of the cartridge or the like with which the ink jet textile printing penetrant is in contact into the ink jet textile printing penetrant.

SUMMARY

An advantage of some aspects of the invention is to provide an ink jet textile printing penetrant which is excellent in discharge stability in a case of being used for an ink jet apparatus.

As a result of intensive research in order to solve the problems of the techniques in the related art described above, the inventors discovered that an ink jet textile printing penetrant which includes a water-soluble organic solvent, a surfactant, and a compound which has a predetermined structure at specific amounts or more has excellent discharge stability, thereby completing the invention.

The invention is as follows.

[1] An ink jet textile printing penetrant including: a water-soluble organic solvent; a surfactant; and one type or two or more types selected from the group consisting of a chelating agent and an aromatic compound.

[2] The ink jet textile printing penetrant according to [1], in which the chelating agent is one type or two or more types selected from the group consisting of disodium ethylenediaminetetraacetate, diammonium ethylenediaminetetraacetate, trisodium ethylenediaminesuccinate, tetrasodium iminodisulfosuccinate, tetrasodium dicarboxymethylglutamate, and disodium nitrilotriacetate.

[3] The ink jet textile printing penetrant according to [1] or [2], in which the chelating agent is in a range of 0.001 mass % to 0.1 mass % with respect to a total amount of the ink jet textile printing penetrant.

[4] The ink jet textile printing penetrant according to [1] to [3], in which the aromatic compound is one type or two or more types selected from the group consisting of a compound which is represented by Formula (I) below, a compound which is represented by Formula (II) below, and derivatives of these compounds,

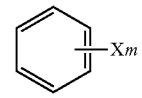
(I)

(in Formula (I), X's each independently represent $SO_3R$, $COOR$, or $OPO(OR)_2$, R's each independently represent H, Li, Na, or K, and m is an integer of 1 or 2)

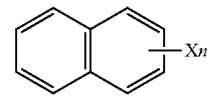
(II)

(in Formula (II), X's each independently represent $SO_3R$, $COOR$, or $OPO(OR)_2$, R's each independently represent H, Li, Na, or K, and n is an integer of 1 to 3).

[5] The ink jet textile printing penetrant according to [1] to [4], in which the aromatic compound is in a range of 0.01 mass % to 50.0 mass % with respect to a total amount of the ink jet textile printing penetrant.

[6] The ink jet textile printing penetrant according to [1] to [5], in which light absorbance in a maximum absorption wavelength in a visible light region is less than 0.05.

[7] The ink jet textile printing penetrant according to [1] to [6], in which the water-soluble organic solvent is in a range of 10 mass % or more with respect to a total amount of the ink jet textile printing penetrant.

[8] An ink jet recording apparatus including: the ink jet textile printing penetrant according to [1] to [7].

DESCRIPTION OF EXEMPLARY EMBODIMENTS

Detailed description will be given below of an exemplary embodiment (referred to below as "the present embodiment"). The present embodiment below is an example for illustrating the invention and is not meant to limit the invention to the content below. It is possible to appropriately modify the invention within the range of the gist thereof.

In the present specification, "ink jet printing" refers to recording (printing) ink on a cloth which is one type of target recording medium using an ink jet method, and is one type of ink jet recording. "Recorded matter" refers to an image being formed on a target recording medium by ink being recorded thereon. "Printed matter" is included in the recorded matter described above and refers to an image being formed on a cloth which is one type of target recording medium by ink being recorded thereon.

The ink jet textile printing penetrant of the present embodiment (also simply referred to below as a "penetrant") includes a water-soluble organic solvent, a surfactant, and one type or two or more types selected from the group consisting of a chelating agent and an aromatic compound. An ink jet textile printing penetrant 1 which will be described below is an aspect which includes a chelating agent and an ink jet textile printing penetrant 2 is an aspect which includes an aromatic compound; however, both a chelating agent and an aromatic compound may be included. Below, cases of simply referring to an "ink jet textile printing penetrant" or a "penetrant" refer to an ink jet textile printing penetrant or a penetrant in a case where the ink jet textile printing penetrant 1 and the ink jet textile printing penetrant 2 are not differentiated. In addition, in the present specification, a "penetrant" refers to a penetrant which is able to control the permeability of ink on the cloth described above into the cloth.

Ink Jet Textile Printing Penetrant 1

The ink jet textile printing penetrant 1 of the present embodiment (also simply referred to below as a "penetrant 1") includes a water-soluble organic solvent, a surfactant, and a chelating agent. In addition, an ink jet textile printing penetrant preferably includes the chelating agent described above at 0.001 mass % to 0.1 mass % with respect to the total amount (100 mass %) of the ink jet textile printing penetrant.

Ink Jet Textile Printing Penetrant 2

The ink jet textile printing penetrant 2 of the present embodiment (also simply referred to below as a "penetrant 2") includes a water-soluble organic solvent, a surfactant, and an aromatic compound. In addition, the penetrant 2 preferably includes one type or two or more types of the aromatic compound described above (also referred to below as a "specific aromatic compound") selected from the group consisting of a compound which is represented by Formula (I) below, a compound which is represented by Formula (II) below, and derivatives of these compounds. Furthermore, the penetrant 2 more preferably includes the water-soluble organic solvent described above at 10 mass % or more with respect to the total amount (100 mass %) of the penetrant 2.

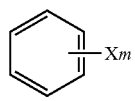
(I)

(In Formula (I), X's each independently represent $SO_3R$, $COOR$, or $OPO(OR)_2$, R's each independently represent H, Li, Na, or K. m is an integer of 1 or 2.)

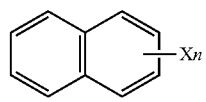
(II)

(In Formula (II), X's each independently represent $SO_3R$, $COOR$, or $OPO(OR)_2$, R's each independently represent H, Li, Na, or K. n is an integer of 1 to 3.)

The ink jet textile printing penetrant of the present embodiment is used as a penetrant for ink jet printing. When forming an image by attaching ink to a cloth by an ink jet method, by attaching the ink jet textile printing penetrant thereto at a landing position of the ink, there is an effect in which the ink favorably permeates to the rear surface of the cloth and it is possible to realize printed matter which exhibits favorable colors not only on the front surface but also on the rear surface.

Detailed description will be given below of additives (components) which are included or may be included in the ink jet textile printing penetrant described above.

Specific Aromatic Compound

The penetrant 2 of the present embodiment preferably includes one type or two or more types of the aromatic compound selected from the group consisting of a compound which is represented by Formula (I) below, a compound which is represented by Formula (II) below, and derivatives of these compounds. Such a compound is also referred to below as a "specific aromatic compound".

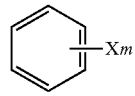
(I)

In Formula (I), X's each independently represent $SO_2R$, $COOR$, or $OPO(OR)_2$, R's each independently represent H, Li, Na, or K. X preferably represents $SO_2R$ from the point of view of more easily dissolving a specific aromatic compound in water. m is an integer of 1 or 2.

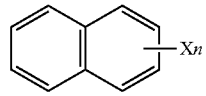
(II)

In Formula (II), X's each independently represent $SO_2R$, $COOR$, or $OPO(OR)_2$, R's each independently represent H, Li, Na, or K. X preferably represents $SO_2R$ from the point of view of more easily dissolving a specific aromatic compound in water. n is an integer of 1 to 3.

By including a specific aromatic compound in the penetrant 2, in a case of being used for an ink jet apparatus, that is, in a case where the penetrant 2 is discharged by an ink jet method, the penetrant 2 exhibits excellent discharge stability and clogging recovery and does not easily generate filter clogging. The causes are assumed to be as follows (however, the causes are not limited thereto). In the related art, since transparency is demanded for penetrants which are used for printing, compounds (for example, dyes which are used for printing) which improve the conductivity of the penetrant tend to decrease the transparency and therefore are not contained in the penetrant. On the other hand, it is assumed that when using a penetrant with low conductivity, the penetrant easily becomes insoluble or is precipitated in a case where impurities (for example, a releasing agent or lubricant) elute from an inner wall or the like of a cartridge with which the penetrant is in contact to the penetrant and, due to this, the discharge stability and clogging recovery are lost. In contrast, since the conductivity of the penetrant 2 is improved by including a specific aromatic compound in the penetrant 2 of the present embodiment, it is difficult for the impurities described above to elute to the penetrant and, even when eluted, insolubilization, precipitation, and the like are suppressed. As a result, since it is difficult for foreign matter to be present in the penetrant 2, the penetrant 2 of the present embodiment is able to obtain excellent discharge stability and clogging recovery and does not easily generate filter clogging. In a case where the penetrant includes an acene-based compound or a phene-based aromatic compound such as anthracene and phenanthrene instead of the specific aromatic compound, it is difficult to use the penetrant as an ink jet textile printing penetrant since the penetrant is colored due to the light absorption region of the acene-based compound or the phene-based aromatic compound.

The specific aromatic compound of the present embodiment is not particularly limited as long as the specific aromatic compound is a compound which has a benzene ring or a naphthalene ring which has a specific substituent group; however, examples thereof include a sulfonic acid aromatic compound, a carboxylic acid aromatic compound, and a phosphoric acid aromatic compound.

The sulfonic acid aromatic compound is not particularly limited; however, examples thereof include benzene sulfonic acids such as benzene sulfonic acid, 4-amino-benzene sulfonic acid, and 4-hydroxy-benzene sulfonic acid, and derivatives thereof; benzene disulfonic acids such as benzene-1,3-disulfonic acid; naphthalene sulfonic acids such as naphthalene-1-sulfonic acid, naphthalene-2-sulfonic acid, 8-amino-naphthalene-2-sulfonic acid, and 8-hydroxy-naphthalene-1-sulfonic acid, and derivatives thereof; naphthalene disulfonic acids such as naphthalene-1,5-disulfonic acid, naphthalene-2,6-disulfonic acid, naphthalene-2,7-disulfonic acid, 7-hydroxy-naphthalene-1,3-disulfonic acid, and 4-amino-5-hydroxynaphthalene-2,7-disulfonic acid, and derivatives thereof; naphthalene trisulfonic acids such as naphthalene-1,3,5-trisulfonic acid, naphthalene-1,3,6-trisulfonic acid, and 7-amino naphthalene-1,3,6-trisulfonic acid, and derivatives thereof. As is clear from the description above, examples of derivatives of each of the sulfonic acids described above include compounds where a hydrogen atom which bonds with a benzene ring or a naphthalene ring is substituted with an amino group or a hydroxyl group. Among these, naphthalene sulfonic acids, naphthalene disulfonic acids, naphthalene trisulfonic acids, and derivatives thereof are preferable, and naphthalene disulfonic acids and derivatives thereof are more preferable.

The carboxylic acid aromatic compound is not particularly limited; however, examples thereof include benzoic acid, phthalic acid, isophthalic acid, terephthalic acid, trimesic acid, 1-naphthoic acid, 2-naphthoic acid, 6-amino-2-naphthoic acid, and naphthalene-2,6-dicarboxylic acid.

The phosphoric acid aromatic compound is not particularly limited; however, examples thereof include 1-naphthyl phosphoric acid and 2-naphthyl phosphoric acid.

The specific aromatic compound is preferably benzene sulfonic acid, 8-amino naphthalene-2-sulfonic acid, naphthalene-1,5-disulfonic acid, benzoic acid, 2-naphthoic acid, 6-amino-2-naphthoic acid, and salts thereof.

The specific aromatic compound may be used as one type individually or may be used in a combination of two or more types.

The content of the specific aromatic compound is preferably 0.01 mass % to 50 mass % with respect to the total amount (100 mass %) of the penetrant 2, more preferably 0.1 mass % to 20 mass %, and even more preferably 0.2 mass % to 10 mass %. When the content is within the ranges described above, there is a tendency for the discharge stability and clogging recovery of the penetrant 2 to be more favorable and the generation of filter clogging to be further suppressed.

The light absorbance of the penetrant 2 in the maximum absorption wavelength in a visible light region is preferably less than 0.05 from the point of view of not coloring the penetrant 2, more preferably less than 0.03, and even more preferably less than 0.01. The light absorbance being less than 0.05 further suppresses coloring of the penetrant 2. The lower limit of the light absorbance is not particularly limited and may be the detection limit or less or may be, for example, 0.001. It is possible to measure the light absorbance by the method which is described in the Examples which will be described below.

Chelating Agent

The penetrant 1 of the present embodiment includes a chelating agent. In addition, the penetrant 1 preferably includes the chelating agent at 0.001 mass % to 0.1 mass % with respect to the total amount (100 mass %) of the penetrant 1. In a case of using the penetrant 1 for an ink jet apparatus, that is, in a case where the penetrant 1 is discharged by an ink jet method, including the chelating agent results in the penetrant 1 exhibiting excellent discharge stability and clogging recovery and not easily generating filter clogging. The reason is assumed to be that, by including the chelating agent, in a case where the conductivity of the penetrant 1 is increased and impurities formed of heavy metal salt are eluted, the chelating agent in the penetrant 1 effectively taking in the impurities such that the discharge stability and clogging recovery are exhibited and filter clogging is not easily generated (however, the reason is not limited thereto).

The penetrant 2 of the present embodiment preferably further includes a chelating agent. In a case where the conductivity of the penetrant is increased and impurities formed of heavy metal salt are eluted, including the chelating agent so as to effectively take in the impurities in results in a tendency for the discharge stability and clogging recovery to be superior and filter clogging to be less easily generated.

The chelating agent has a coordinating group which is able to have a coordinating bond with a cation in a form where the cation is interposed in the center. The chelating agent is not particularly limited and examples thereof include compounds which have a coordinating group, resins, salts thereof, and hydrates thereof. The coordinating atom which forms the coordinating group is not particularly limited; however, examples thereof include an N atom, an S atom, and an O atom.

The specific chelating agent is not particularly limited; however, examples thereof include ethylene diamine tetraacetate, N-(2-hydroxyethyl) ethylenediamine triacetate, ethylenediamine succinate, iminodisulfonyl sulfosuccinate, dicarboxymethyl glutamate, bis(2-aminoethyl) ethylene glycol tetraacetic acid, bis(2-aminophenyl) ethylene glycol tetraacetic acid, bis(2-hydroxyethyl) glycine, 1,2-diaminocyclohexane tetraacetic acid, diethylenetriaminepentaacetic acid, iminodiacetic acid, N-(2-hydroxyethyl) iminodiacetic acid, nitrilotriacetic acid, nitrilotriacetic methylphosphoric acid, triethylenetetraamine hexaacetic acid, and compounds of tetrakis (2-pyridylmethyl) ethylenediamine.

The chelating agent may be, for example, a resin where a phenol resin, a styrene resin, an acryl resin, or an epoxy resin has a coordinating group.

The chelating agent may be a salt of a compound or resin described above and cations such as Na, K, Al, Ba, Bi, Ca, Ce (III), Co (II), Cr, Cu (II), Dy, Eu, Fe (III), Ga, Ge, Hf, In, La, Mg, Mn (II), Mn (III), Mo, Nd, Ni, Pb, Pd (II), Pt (II), Rh, Ru, Sb (III), Sm, Sn (II), Sr, Ti, Th, W (VI), Y, Zn (II), Zr, $NH_4^+$, $UO_2^{2+}$, and $VO_2^+$.

The chelating agent may be a hydrate of the above-described compounds, resins, and salts thereof. Examples of the hydrate include a hydrate of 1,2-diamonocyclohexane tetraacetate and bis(2-amino phenyl) ethylene glycol tetraacetate.

The chelating agent is preferably ethylene diamine tetraacetate, ethylenediamine succinate, iminodisulfonyl sulfosuccinate, dicarboxymethyl glutamate, nitrilotriacetate, or salts thereof, and more preferably one type or two or more types which are selected from the group consisting of disodium ethylenediaminetetraacetate, diammonium ethylenediamine tetraacetate, trisodium ethylenediamine succinate, tetrasodium iminodisulfonyl sulfosuccinate, tetrasodium dicarboxymethyl glutamate, and disodium nitrilotriacetate.

The chelating agent may be used as one type individually or may be used in a combination of two or more types.

The content of the chelating agent is preferably 0.001 mass % to 0.1 mass % with respect to the total amount (100 mass %) of the penetrant 1, more preferably 0.003 mass % to 0.05 mass %, and even more preferably 0.005 mass % to 0.03 mass %. When the content is within the ranges described above, the discharge stability and clogging recovery of the penetrant are favorable and the generation of filter clogging is suppressed.

The content of the chelating agent is preferably 0.001 mass % to 0.1 mass % with respect to the total amount (100 mass %) of the penetrant 2, more preferably 0.003 mass % to 0.05 mass %, and even more preferably 0.005 mass % to 0.03 mass %. When the content is within the ranges described above, there is a tendency for the discharge stability and clogging recovery of the penetrant to be more favorable and the generation of filter clogging to be further suppressed.

Surfactant

The penetrant of the present embodiment includes a surfactant. The surfactant is not particularly limited; however, one or more types selected from the group consisting of acetylene glycol-based surfactants, acetylene alcohol-based surfactants, and polysiloxane-based surfactants are preferable. Including the surfactant in the penetrant results in a tendency for the permeability of the ink composition which is attached to a cloth to be more favorable and printing at a faster speed is possible. In addition, the discharge stability and clogging recovery of the penetrant are more favorable and the generation of filter clogging is further suppressed.

The acetylene glycol-based surfactant and the acetylene alcohol-based surfactant described above are not particularly limited; however, one or more types selected from the group consisting of 2,4,7,9-tetramethyl-5-decyne-4,7-diol and alkylene oxide adducts of 2,4,7,9-tetramethyl-5-decyne-4,7-diol, and 2,4-dimethyl-5-decyne-4-ol and alkylene oxide adducts of 2,4-dimethyl-5-decyne-4-ol are preferable. These are available as commercial products such as the Olefin 104 series, the E series such as Olefin E1010, Olefin PD002W002, Surfynol 465, Surfynol 61 (product names, produced by Nissin Chemical Industry Co., Ltd.), PELEX SS-H (product name, produced by Kao Chemicals Corp.) and the like.

The polysiloxane-based surfactant described above is not particularly limited; however, examples of commercially available products thereof include BYK-347 and BYK-348 (product names produced by BYK Japan KK)

The surfactants may be used as one type individually or may be used in a combination of two or more types.

The content of the surfactant is preferably 0.1 mass % to 5.0 mass % with respect to the total amount (100 mass %) of the penetrant, more preferably 0.2 mass % to 3.0 mass %, and even more preferably 0.3 mass % to 2.0 mass %. When the content is within the ranges described above, there is a tendency for the discharge stability and clogging recovery of the penetrant are more favorable and generation of filter clogging is further suppressed.

Water-Soluble Organic Solvent and Water

The penetrant of the present embodiment is water-soluble and includes a water-soluble organic solvent and may include an aqueous solvent other than the water-soluble organic solvent. Examples of the aqueous solvent include water.

The water-soluble organic solvents are not particularly limited; however, examples thereof include polyhydric alcohols such as ethylene glycol, diethylene glycol, triethylene glycol, polyethylene glycol, polypropylene glycol, propylene glycol, butylene glycol, 1,2-hexanediol, 1,2,6-hexanetriol, thioglycol, hexylene glycol, glycerin, trimethylol ethane, and trimethylol propane; alkyl ethers of polyhydric alcohols such as ethylene glycol monoethyl ether, ethylene glycol monobutyl ether, diethylene glycol monomethyl ether, diethylene glycol monoethyl ether, diethylene glycol monobutyl ether, diethylene glycol monoisobutyl ether, diethylene glycol monohexyl ether, triethylene glycol monomethyl ether, triethylene glycol monoethyl ether, triethylene glycol monobutyl ether, hexaethylene glycol monoethylhexyl ether (for example, "Newcol 1006", product name, produced by Nippon Nyukazai Co., Ltd.), tetraethylene glycol monoethylhexyl ether (for example, "Newcol 1004" product name, produced by Nippon Nyukazai Co., Ltd,) and the like; lactams such as epsilon-caprolactam; urea, 2-pyrrolidone, N-methyl-2-pyrrolidone, and 1,3-dimethyl-2-imidazolidinone, and the like.

The water-soluble organic solvent may be used as one type individually or may be used in a combination of two or more types.

The content of the water-soluble organic solvent is preferably 10 mass % or more with respect to the total amount (100 mass %) of the penetrant 1, more preferably 10 mass % to mass %, and even more preferably 30 mass % to 60 mass %. When the content is 10 mass % or more, there is a tendency for the discharge stability and clogging recovery of the penetrant 1 to be more favorable and the generation of filter clogging to be further suppressed.

The content of the water-soluble organic solvent is preferably 10 mass % or more with respect to the total amount (100 mass %) of the penetrant 2, more preferably 10 mass % to mass %, and even more preferably 30 mass % to 60 mass %. When the content is 10 mass % or more, there is a tendency for the discharge stability and clogging recovery of the penetrant 2 to be favorable and the generation of filter clogging to be suppressed.

The water is not particularly limited and it is possible to use pure water or ultra-pure water such as ion-exchanged water, ultrafiltration water, reverse osmosis water, and distilled water. The content of the water is not particularly limited and may be appropriately determined as necessary and it is sufficient if the water is included as a residual portion of other components which are included in the penetrant. For example, the content of the water may be 70 mass % to 95 mass % with respect to the total amount (100 mass %) of the ink jet textile printing penetrant.

Other Additives (Components)

The ink jet textile printing penetrant described above may further include thermochromic coloring materials, resin emulsions, and additives of water (referred to below as "other additives") other than the above. The other additives are not limited to the following; however, examples thereof include a cationic substance which has an aggregating effect in the same manner as a chelating agent, a sizing agent, a pH adjusting agent such as isopropanol amine and triethanol amine, a reduction inhibitor, a metal ion sealing agent, a moisturizer, a penetrating agent, and a defoaming agent.

Ink Jet Printing Method

The ink jet printing method of the present embodiment includes forming an image on a cloth by ink jet printing which uses the ink jet textile printing penetrant described above and an ink composition known in the art. For example, the ink jet printing method described above has a recording step of attaching an ink composition which includes a dye on the surface of a cloth by an ink jet method and a penetrant attaching step of attaching the penetrant of the present embodiment on the front surface or the rear surface of the cloth described above before, after, or at the same time as the recording step.

The cloth which is used for the ink jet printing method described above is not limited to the following; however, examples thereof include natural fibers or synthesized fibers such as silk, cotton, wool, nylon, polyester, and rayon. The cloth may be formed of one type of fiber or may be formed by mixing two or more types of fibers. In particular, by using a cloth formed by blending fibers with different permeability among these, the effect of the penetrant of the present embodiment is easily obtained. The cloth may take any form where the fibers described above are textiles, knitted, non-woven fabric, and the like.

In the ink jet printing described above, the ink composition is loaded into an ink jet apparatus for use. The ink jet apparatus is not particularly limited; however, examples thereof include a drop-on-demand type ink jet apparatus. These drop-on-demand type ink jet apparatuses include an apparatus which adopts an ink jet printing method which uses a piezoelectric element which is installed in a head, an apparatus which adopts an ink jet printing method which uses thermal energy from a heater such as heat-resistant element which is installed in a head, and the like, and the apparatus may adopt any ink jet printing method. Detailed description will be given below of each of the steps which are included in the ink jet printing method.

Pretreatment Step

In a case of employing an ink jet printing method using the ink composition of the present embodiment with respect to a cloth, pretreatment is preferably carried out on the cloth using a pretreatment agent beforehand in the same manner as for general ink jet printing methods. The pretreatment of the cloth is performed using a means for attaching the pretreatment agent to the cloth by immersing the cloth in the pretreatment agent, by coating or spraying the pretreatment agent on the cloth, or the like, and then drying the cloth.

The pretreatment agent of the cloth is not particularly limited; however, examples thereof include a pretreatment solution which is an aqueous solution containing a sizing agent such as a water-soluble polymer compound at 0.01 mass % to 20 mass % with respect to the total amount (100 mass %) of the pretreatment agent and an alkali generating agent at 1.0 mass % to 5.0 mass %. The sizing agent described above is not particularly limited; however, examples thereof include starch substances such as corn, and wheat; cellulose-based materials such as carboxymethyl cellulose, and hydroxyethyl cellulose; polysaccharides such as alginate sodium, gum arabic, locust bean gum, gum tragacanth, guar gum, and tamarind seed; proteins such as gelatin and casein; tannins; natural water-soluble polymers such as lignin, synthetic water-soluble polymer compounds such as polyvinyl alcohol-based compounds, polyethylene oxide-based compounds, acrylic acid-based compounds, and maleic anhydride-based compounds. The alkali generating agent described above is not particularly limited; however, examples thereof include sodium hydrogen carbonate and sodium carbonate. As necessary, the pretreatment agent can also contain various additives such as moisturizing agents such as urea and thiourea, pH adjusting agents, reduction inhibitors, penetrating agents, sequestering agents, and anti-foaming agents.

The cloth to which the pretreatment agent is attached is dried, for example, by heating the cloth. The heating temperature at that time is preferably 100° C. or more, more preferably 110° C. to 200° C., and even more preferably 120° C. to 180° C. In addition, the heating time is preferably within 2 minutes. When the heating temperature is 100° C. or more, there is a tendency for the fixing property of the penetrant to be favorable. When the heating temperature is 200° C. or less, there is a tendency for it to be possible to effectively prevent deterioration of the cloth and deterioration of the penetrant components such as polymers. In addition, the drying means is not limited to the following; however, examples thereof include drying using a hot pressing machine, an oven, or the like.

Recording Step and Penetrant Attaching Step

The recording step of the present embodiment is, for example, for attaching an ink composition to a cloth after the pretreatment step described above. In detail, an image is formed by discharging and attaching the ink composition described above onto a surface (an image forming region) of the dried cloth. Here, the discharge conditions may be appropriately determined according to the physical properties of the discharged ink composition. In addition, as the ink composition, it is possible to use ink compositions known in the art which are used for ink jet printing.

The penetrant attaching step of the present embodiment is a step for attaching the penetrant of the present embodiment to the front surface or rear surface of a cloth before, after, or at the same time as the recording step. The means for attaching the penetrant of the present embodiment is an ink jet method.

The penetrant attaching step may be performed before, after, or at the same time as the recording step, or may be performed at a combination thereof. In a case of performing the penetrant attaching step before the recording step, the recording step is preferably performed before the penetrant which is attached to the cloth is dried. In addition, in a case of performing the penetrant attaching step after the recording step, it is possible to perform the penetrant attaching step before or after the ink composition which is attached to the cloth is dried, and the penetrant attaching step is preferably performed before the ink composition which is attached to the cloth is dried. The penetrant may be attached to the front surface of the cloth, may be attached to the rear surface, or may be attached to both the front surface and the rear surface.

Heating Step

The ink jet printing method of the present embodiment may further have a heating step of heating a cloth after the recording step and the penetrant attaching step. Having a heating step makes it possible to more favorably dye the fibers which form the cloth with the dye. The heating method is not particularly limited; however, examples thereof include a high temperature steaming method (an HT method), a high pressure steaming method (an HP method), and a thermosol method.

In addition, in the heating step, a pressure treatment may or may not be carried out on the ink composition attaching surface on the cloth. Examples of a heating method in which a pressure treatment is not carried out on the ink composition attaching surface on the cloth include drying in an oven (a method in which pressing is not carried out such as a conveyor oven or a batch oven). Having the heating step further improves the productivity of the recorded matter. In addition, the heating method in which a pressure treatment is also carried out on the ink composition attaching surface on the cloth is not particularly limited; however, examples thereof include heat pressing and wet-on-dry methods. "Pressure" refers to applying pressure to a target recording medium through contact with an individual body.

The temperature during the heating treatment is preferably 80° C. to 150° C. and more preferably 90° C. to 110° C. The temperature being within the ranges described above during the heating treatment results in a tendency for it to be possible to more favorably dye the fibers which form the cloth with the dye.

Cleaning Step

The ink jet printing method of the present embodiment may further have a cleaning step for cleaning the cloth after the heating step. It is possible to effectively remove dye which is not dyed in the fibers through the cleaning step. It is possible to perform the cleaning step, for example, using water, and a soaping treatment may be performed as necessary. The soaping treatment method is not particularly limited; however, examples thereof include a method of washing off so-called non-fixed dye using a heated soap liquid or the like.

In this manner, it is possible to obtain recorded matter such as printed matter where an image which is derived from the ink composition described above is formed on a target recording medium such as a cloth.

Ink Jet Recording Apparatus

The ink jet recording apparatus of the present embodiment is provided with the ink jet textile printing penetrant (penetrant) described above. Here, the ink jet recording apparatus which is provided with a penetrant is not particularly limited as long as the ink jet recording apparatus is an ink jet recording apparatus which is provided with a penetrant so as to be able to perform the ink jet printing method described above using the penetrant and examples thereof include an ink jet recording apparatus which has a cartridge and a recording head where a penetrant is filled in the cartridge and it is possible to discharge the penetrant from the recording head.

EXAMPLES

Detailed description will be given below of the invention using Examples and Comparative Examples. The invention is not limited by the Examples below.

Materials of Ink Jet Textile Printing Penetrant

The main materials of the ink jet textile printing penetrant used in the Examples and Comparative Examples below are as follows.

Aromatic Compounds
 Naphthalene-1,5-disulfonic acid lithium
 8-amino-naphthalene-2-sodium sulfonate
 Sodium benzenesulfonate
 2-lithium-naphthoate
 Potassium 6-amino-2-naphthoate
 Sodium benzoate
 Sodium 2-naphthyl phosphate
 Sodium phenanthrene 9-sulfonate
 9,10-dimethoxy-anthracene-2-sodium sulfonate
Chelating Agent
 Disodium ethylenediamine tetraacetate
 Tetrasodiumiminodisulfonyl sulfosuccinate
 Diammoniumethylenediaminetetraacetate
 Disodium nitrilotriacetate
 Tetrasodiumdicarboxymethyl glutamate
 Trisodium ethylenediaminedisuccinate
Surfactant
 Olefin E1010 (product name, produced by Nissin Chemical Industry Co., Ltd.)
 Olefin PD002W (product name, produced by Nissin Chemical Industry Co., Ltd.)
 Pelex SS-H (produced by Kao Chemical Corp.)
Water-Soluble Organic Solvent
 Glycerine
 Triethylene glycol
 Propylene glycol
 1,2-hexane diol
 Diethylene glycol monobutyl ether
 Triethylene glycol monobutyl ether
 2-pyrrolidone
 ε-caprolactam
pH Adjusting Agent
 Isopropanolamine
 Triethanolamine
Preparation of Ink Jet Textile Printing Penetrant Each component (material) was mixed in the compositions which are shown in Table 1 and Table 2 below and sufficiently stirred to obtain each ink jet textile printing penetrant. In Table 1 and Table 2 below, the unit of the numeric values is mass % and the total is 100.0 mass %.

Light Absorbance 1 mL of each ink jet textile printing penetrant was put in a measuring flask and diluted to 1000 mL by adding water and the light absorbance was measured under the conditions below using the spectrophotometer below. From the measurement results, the light absorbance in a wavelength (λ max) where the light absorbance was maximum was obtained. The colors in parentheses in Table 1 and Table 2 indicate colors in a case where the ink jet textile printing penetrant is colored.

Spectrophotometer: manufactured by Hitachi Ltd., product name "U-3300"
Light measurement method: double beam direct ratio optical measurement method
Spectrometer: Seya-Namioka type spectrometer
Light source: iodine tungsten lamp (measurement wavelength λ: 800 nm to 340 nm)
Deuterium discharge tube (measurement wavelength λ: 340 nm to 300 nm)
Measurement mode: light absorbance (Abs.)
Slit width: 2 nm
Cell: quartz
Reference: water Discharge Stability Ink and a penetrant in ink cartridges which were positioned at both ends of a recording head of an ink jet apparatus (product name "SP-30160", manufactured by Seiko Epson Corp.) in a main scanning direction were exchanged. Subsequently, the ink jet apparatus was operated at a temperature of 35° C. and it was confirmed that the penetrant was properly discharged from the nozzles of the recording head. Furthermore, the discharging of the penetrant from the nozzles of the recording head was continued and evaluation was carried out according to the evaluation criteria below. In the confirmation of the discharging property, discharge was carried out onto a hard plastic film (a back-light film designated for super fine use, manufactured by Seiko Epson Corp.) and whether or not a liquid was attached on the film surface was confirmed.

S: After operating for 7 days, there were less than 3 occurrences of faulty and/or bent nozzles.

A: After operating for 4 days, there were less than 3 occurrences of faulty or bent nozzles and, after operating for 7 days, there were 3 or more occurrences of faulty or bent nozzles.

B: After operating for 1 day, there were less than 3 occurrences of faulty or bent nozzles and, after operating for 4 days, there were 3 or more occurrences of faulty or bent nozzles.

C: After operating for 4 hours, there were less than 3 occurrences of faulty or bent nozzles and, after operating for 1 day, there were 3 or more occurrences of faulty or bent nozzles.

D: After operating for 4 hours, there were 3 or more occurrences of faulty or bent nozzles.

Clogging Recovery

Ink and a penetrant in ink cartridges which were positioned at both ends of a recording head of an ink jet apparatus (product name "SP-30160", manufactured by Seiko Epson Corp.) in a main scanning direction were exchanged. Subsequently, the operation of the ink jet apparatus was started under a temperature of 35° C. and it was confirmed that the penetrant was properly discharged from nozzles of the recording head. After that, the operation was stopped, the apparatus was left at a temperature of 40° C. for one month, and evaluation was carried out according to the evaluation criteria below. Regarding the cleaning below, a cleaning operation which was provided in the ink jet apparatus was performed.

S: The recovery was carried out by one cleaning.

A: The recovery was not carried out by one cleaning but the recovery was carried out by 2 or 3 cleanings.

B: The recovery was not carried out by 3 cleanings but the recovery was carried out by 4 or 5 cleanings.

C: The recovery was not carried out by 5 cleanings but the recovery was carried out by 6 cleanings.

D: The recovery was not carried out even by 6 cleanings.

Filter Clogging

Flow channel members (50 rib tops and a 1 m flow channel tube) of an ink cartridge which is used for an ink jet apparatus (product name "SP-30160", manufactured by Seiko Epson Corp.) were immersed in 300 mL of a penetrant at 70° C. for 6 days. The penetrant after immersion was passed through a stainless steel filter (passing particle diameter: approximately 5 μm) of a twill mat weave mesh No. 2300 and the clogging rate (the area ratio) of the holes was evaluated.

This application claims priority to Japanese Patent Application No. 2015-148867 filed on Jul. 28, 2015. The entire disclosure of Japanese Patent Application No. 2015-148867 is hereby incorporated herein by reference.

TABLE 1

| | | | Examples | | | | | | | |
|---|---|---|---|---|---|---|---|---|---|---|
| | | | 1-1 | 1-2 | 1-3 | 1-4 | 1-5 | 1-6 | 1-7 | 1-8 |
| Composition | Aromatic compound | Naphthalene-1,5-disulfonic acid lithium | | | | | | | | |
| | | 8-amino-naphthalene-2-sodium sulfonate | | | | | | | | |
| | | Sodium benzenesulfonate | | | | | | | | |
| | | 2-lithium-naphthoate | | | | | | | | |
| | | Potassium 6-amino-2-naphthoate | | | | | | | | |
| | | Sodium benzoate | | | | | | | | |
| | | Sodium 2-naphthyl phosphate | | | | | | | | |
| | Chelating Agent | Disodium ethylenediamine tetraacetate | 0.02 | | | | | | | |
| | | Tetrasodiumiminodisulfonyl sulfosuccinate | | 0.03 | | | | | 0.1 | 0.2 |
| | | Diammoniumethylene diaminetetraacetate | | | | | 0.01 | | | |
| | | Disodium nitrilotriacetate | | | 0.001 | | | | | |
| | | Tetrasodiumdicarboxy methylglutamate | | | | | | 0.05 | | |
| | | Trisodium ethylenediaminedisuccinate | | | | | | | 0.0005 | |
| | Surfactant | Olefin E1010 (product name, produced by Nissin Chemical Industry Co., Ltd.) | 0.5 | | | 1.0 | 1.0 | | | |
| | | Olefin PD002W (product name, produced by Nissin Chemical Industry Co., Ltd.) | | 0.5 | | | | | 0.5 | 0.5 |

TABLE 1-continued

|  |  |  |  |  |  |  |  |  |  |
|---|---|---|---|---|---|---|---|---|---|
|  |  | Pelex SS-H (produced by Kao Chemical Corp.) |  | 1.5 |  |  | 1.5 |  |  |
|  | Organic Solvent type | Glycerine | 15 |  |  | 15 |  |  |  |
|  |  | Triethylene glycol | 30 |  |  | 30 |  |  |  |
|  |  | Propylene glycol |  | 5 |  |  |  | 5.0 | 5.0 |
|  |  | 1,2-hexane diol |  |  | 15 |  | 15 |  |  |
|  |  | Diethylene glycol monobutyl ether |  |  | 15 |  | 15 |  |  |
|  |  | Triethylene glycol monobutyl ether |  |  |  | 10 |  |  |  |
|  |  | 2-pyrrolidone |  | 35 |  |  |  | 35 | 35 |
|  |  | ε-caprolactam |  |  |  |  |  |  |  |
|  | pH Adjusting Agent | Isopropanolamine |  |  | 0.2 |  | 0.2 |  |  |
|  |  | Triethanolamine | 0.1 | 0.2 |  | 0.2 | 0.1 |  | 0.1 | 0.1 |
|  | Water |  | Remainder | Remainder | Remainder | Remainder | Remainder | Remainder | Remainder | Remainder |
| Properties | Light Absorbance (λMax) [Dilution rate: 1 ml/1000 ml] |  | <0.01 | <0.01 | <0.01 | <0.01 | <0.01 | <0.01 | <0.01 | <0.01 |
| Evaluation | Clogging recovery |  | B | A | C | B | A | C | B | B |
|  | Discharge stability |  | S | A | S | S | A | S | B | B |
|  | Filter clogging |  | 3% | 3% | 5% | 3% | 3% | 5% | 2% | 2% |

|  |  |  | Examples |  |  |  |  |  |  |  |
|---|---|---|---|---|---|---|---|---|---|---|
|  |  |  | 2-1 | 2-2 | 2-3 | 2-4 | 2-5 | 2-6 | 2-7 | 2-8 |
| Composition | Aromatic compound | Naphthalene-1,5-disulfonic acid lithium | 0.5 |  |  |  |  |  |  |  |
|  |  | 8-amino-naphthalene-2-sodium sulfonate |  | 5.0 |  |  |  |  |  |  |
|  |  | Sodium benzenesulfonate |  |  | 0.1 |  |  |  |  |  |
|  |  | 2-lithium-naphthoate |  |  |  |  | 2.0 |  |  |  |
|  |  | Potassium 6-amino-2-naphthoate |  |  |  |  |  |  | 10 | 20 |
|  |  | Sodium benzoate |  |  |  | 0.2 |  |  |  |  |
|  |  | Sodium 2-naphthyl phosphate |  |  |  |  |  | 1.0 |  |  |
|  | Chelating Agent | Disodium ethylenediamine tetraacetate |  |  |  |  |  |  |  |  |
|  |  | Tetrasodiumiminodi-sulfonyl sulfosuccinate |  |  |  |  |  |  |  |  |
|  |  | Diammoniumethylene diaminetetraacetate |  |  |  |  |  |  |  |  |
|  |  | Disodium nitrilotriacetate |  |  |  |  |  |  |  |  |
|  |  | Tetrasodiumdicarboxy methylglutamate |  |  |  |  |  |  |  |  |
|  |  | Trisodium ethylenediaminedi-succinate |  |  |  |  |  |  |  |  |
|  | Surfactant | Olefin E1010 (product name, produced by Nissin Chemical Industry Co., Ltd.) | 0.5 |  |  | 1.0 | 1.0 |  |  |  |
|  |  | Olefin PD002W (product name, produced by Nissin Chemical Industry Co., Ltd.) |  | 0.5 |  |  |  |  | 0.5 | 0.5 |
|  |  | Pelex SS-H (produced by Kao Chemical Corp.) |  |  | 1.5 |  |  | 1.5 |  |  |
|  | Organic Solvent type | Glycerine | 15 |  |  |  | 15 |  |  |  |
|  |  | Triethylene glycol | 30 |  |  |  | 30 |  |  |  |
|  |  | Propylene glycol |  | 5.0 |  |  |  |  | 5.0 | 5.0 |
|  |  | 1,2-hexane diol |  |  | 15 |  |  | 15 |  |  |
|  |  | Diethylene glycol monobutyl ether |  |  | 15 |  |  | 15 |  |  |
|  |  | Triethylene glycol monobutyl ether |  |  |  | 10 |  |  |  |  |
|  |  | 2-pyrrolidone |  | 35 |  |  |  |  | 35 | 35 |
|  |  | ε-caprolactam |  |  |  |  |  |  |  |  |

TABLE 1-continued

|  |  |  | | | | | | | | |
|---|---|---|---|---|---|---|---|---|---|---|
| | pH Adjusting Agent | Isopropanolamine | | | 0.2 | | | 0.2 | | |
| | | Triethanolamine | 0.1 | 0.2 | | 0.2 | 0.1 | | 0.1 | 0.1 |
| | Water | | Remainder | Remainder | Remainder | Remainder | Remainder | Remainder | Remainder | Remainder |
| Properties | Light Absorbance (λMax) [Dilution rate: 1 ml/1000 ml] | | <0.01 | <0.01 | <0.01 | <0.01 | <0.01 | <0.01 | <0.01 | <0.01 |
| Evaluation | Clogging recovery | | A | A | A | B | B | B | B | C |
| | Discharge stability | | A | A | A | B | B | B | C | C |
| | Filter clogging | | 3% | 3% | 5% | 3% | 3% | 3% | 5% | 10% |

TABLE 2

| | | | Examples | | | | | | | | Comparative Examples |
|---|---|---|---|---|---|---|---|---|---|---|---|
| | | | 3-1 | 3-2 | 3-3 | 3-4 | 3-5 | 3-6 | 3-7 | 3-8 | 4-1 |
| Composition | Aromatic compound | Naphthalene-1,5-disulfonic acid lithium | 0.5 | | | | | | | | |
| | Aromatic compound | 8-amino-naphthalene-2-sodium sulfonate | | 5 | | | | | | | |
| | | Sodium benzenesulfonate | | | 0.1 | | | | | | |
| | | 2-lithium-naphthoate | | | | | | 2 | | | |
| | | Potassium 6-amino-2-naphthoate | | | | | | | | 10 | 20 |
| | | Sodium benzoate | | | | | 0.5 | | | | |
| | | Sodium 2-naphthyl phosphate | | | | | | | 1 | | |
| | | Sodium phenanthrene 9-sulfonate | | | | | | | | | |
| | | 9,10-dimethoxy-anthracene-2-sodium sulfonate | | | | | | | | | |
| | Chelating Agent | Disodium ethylenediamine tetraacetate | 0.02 | | | | | | | | |
| | | Tetrasodiumiminodi-sulfonyl sulfosuccinate | | 0.03 | | | | | 0.1 | 0.2 | |
| | | Diammoniumethylene-diaminetetraacetate | | | | 0.01 | | | | | |
| | | Disodium nitrilotriacetate | | | 0.001 | | | | | | |
| | | Tetrasodiumdicarboxy methyl glutamate | | | | | 0.05 | | | | |
| | | Trisodium ethylenediaminedi-succinate | | | | | | 0.0005 | | | |
| | Surfactant | Olefin E1010 (product name, produced by Nissin Chemical Industry Co., Ltd.) | 0.5 | | | 1 | 1 | | | | 0.5 |
| | | Olefin PD002W (product name, produced by Nissin Chemical Industry Co., Ltd.) | | 0.5 | | | | | 0.5 | 0.5 | |
| | | Pelex SS-H (produced by Kao Chemical Corp.) | | | 1.5 | | | 1.5 | | | |
| | Organic Solvent type | Glycerine | 15 | | | | 15 | | | | 15 |
| | | Triethylene glycol | 30 | | | | 30 | | | | 30 |
| | | Propylene glycol | | 5 | | | | | 5 | 5 | |
| | | 1,2-hexane diol | | | 15 | | | 15 | | | |
| | | Diethylene glycol monobutyl ether | | | 15 | | | 15 | | | |
| | | Triethylene glycol monobutyl ether | | | | 10 | | | | | |
| | | 2-pyrrolidone | | 35 | | | | | 35 | 35 | |
| | | ε-caprolactam | | | | | | | | | |
| | pH Adjusting Agent | Isopropanolamine | | | | 0.2 | | 0.2 | | | |
| | | Triethanolamine | 0.1 | 0.2 | | 0.2 | 0.1 | | 0.1 | 0.1 | 0.1 |
| | Water | | Remainder | Remainder | Remainder | Remainder | Remainder | Remainder | Remainder | Remainder | Remainder |

TABLE 2-continued

| Properties | Light Absorbance (λMax) [Dilution rate: 1 ml/1000 ml] | <0.01 | <0.01 | <0.01 | <0.01 | <0.01 | <0.01 | <0.01 | <0.01 | <0.01 |
|---|---|---|---|---|---|---|---|---|---|---|
| Evaluation | Clogging recovery | S | S | A | A | S | A | A | A | D |
| | Discharge stability | S | S | S | S | S | S | A | A | D |
| | Filter clogging | <1% | <1% | 1% | <1% | <1% | 1% | <1% | 1% | >30% |

| | | | | Comparative Examples | | | | | | Reference Examples | |
|---|---|---|---|---|---|---|---|---|---|---|---|
| | | | | 4-2 | 4-3 | 4-4 | 4-5 | 4-6 | 4-7 | 4-8 | 4-9 |
| Composition | Aromatic compound | Naphthalene-1,5-disulfonic acid lithium | | | | | | | | | |
| | Aromatic compound | 8-amino-naphthalene-2-sodium sulfonate | | | | | | | | | |
| | | Sodium benzenesulfonate | | | | | | | | | |
| | | 2-lithium-naphthoate | | | | | | | | | |
| | | Potassium 6-amino-2-naphthoate | | | | | | | | | |
| | | Sodium benzoate | | | | | | | | | |
| | | Sodium 2-naphthyl phosphate | | | | | | | | | |
| | | Sodium phenanthrene 9-sulfonate | | | | | | | | | 2 | |
| | | 9,10-dimethoxy-anthracene-2-sodium sulfonate | | | | | | | | | | 10 |
| | Chelating Agent | Disodium ethylenediamine tetraacetate | | | | | | | | | | |
| | | Tetrasodiumiminodi-sulfonyl sulfosuccinate | | | | | | | | | | 0.2 |
| | | Diammoniumethylene-diaminetetraacetate | | | | | | | | | | |
| | | Disodium nitrilotriacetate | | | | | | | | | | |
| | | Tetrasodiumdicarboxy methyl glutamate | | | | | | | | | 0.05 | |
| | | Trisodium ethylenediamindi-succinate | | | | | | | | | | |
| | Surfactant | Olefin E1010 (product name, produced by Nissin Chemical Industry Co., Ltd.) | | | | 1 | 1 | | | 1 | | |
| | | Olefin PD002W (product name, produced by Nissin Chemical Industry Co., Ltd.) | | 0.5 | | | | | 0.5 | | 0.5 | |
| | | Pelex SS-H (produced by Kao Chemical Corp.) | | | 1.5 | | | | | | | |
| | Organic Solvent type | Glycerine | | | | | 15 | | | 15 | | |
| | | Triethylene glycol | | | | | 30 | | | 30 | | |
| | | Propylene glycol | | 5 | | | | | 5 | | | 5 |
| | | 1,2-hexane diol | | | 15 | | | 15 | | | | |
| | | Diethylene glycol monobutyl ether | | | 15 | | | 15 | | | | |
| | | Triethylene glycol monobutyl ether | | | | 10 | | | | | | |
| | | 2-pyrrolidone | | 35 | | | | | 35 | | 35 | |
| | | ε-caprolactam | | | | | | | | | | |
| | pH Adjusting Agent | Isopropanolamine | | | 0.2 | | | | | | | |
| | | Triethanolamine | | 0.2 | | 0.2 | 0.1 | 0.2 | 0.1 | 0.1 | 0.1 | |
| | | Water | | Re-mainder | Re-mainder | Re-mainder | Re-mainder | Re-mainder | Re-mainder | Re-mainder | Re-mainder |
| Properties | Light Absorbance (λMax) [Dilution rate: 1 ml/1000 ml] | | | <0.01 | <0.01 | <0.01 | <0.01 | <0.01 | <0.01 | 0.05 (Yellow-green) | 0.1 (Red) |
| Evaluation | Clogging recovery | | | D | D | D | D | D | D | — | — |
| | Discharge stability | | | D | D | D | D | D | D | — | — |
| | Filter clogging | | | >30% | >30% | >30% | >30% | >30% | >30% | — | — |

What is claimed is:

1. An ink jet textile printing penetrant comprising:
a water-soluble organic solvent;
a surfactant; and
at least one chelating agent and at least one aromatic compound,
wherein the ink jet textile printing penetrant is colorless,
the chelating agent is one type or two or more types selected from the group consisting of disodium ethylenediaminetetraacetate, diammoniumethylenediaminetetraacetate, trisodiumethylenediaminesuccinate, tetrasodium iminodisulfosuccinate, tetrasodium dicarboxymethylglutamate, and disodium nitrilotriacetate,
the aromatic compound is one type or two or more types selected from the group consisting of a compound which is represented by Formula (I) below, a compound which is represented by Formula (II) below, and derivatives of these compounds,

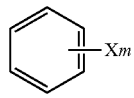  (I)

wherein in Formula (I), X's each independently represent $SO_3R$, COOR, or $OPO(OR)_2$, R's each independently represent H, Li, Na, or K, and m is an integer of 1 or 2; and

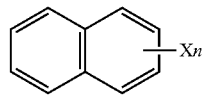  (II)

wherein in Formula (II), X's each independently represent $SO_3R$, COOR, or $OPO(OR)_2$, R's each independently represent H, Li, Na, or K, and n is an integer of 1 to 3, and
the at least one aromatic compound includes naphthalene-1,5-disulfonic acid.

2. The ink jet textile printing penetrant according to claim 1,
wherein the chelating agent is in a range of 0.001 mass % to 0.1 mass % with respect to a total amount of the ink jet textile printing penetrant.

3. The ink jet textile printing penetrant according to claim 1,
wherein the aromatic compound is in a range of 0.01 mass % to 50.0 mass % with respect to a total amount of the ink jet textile printing penetrant.

4. The ink jet textile printing penetrant according to claim 1,
wherein the ink jet textile printing penetrant has a light absorbance in a maximum absorption wavelength in a visible light region is less than 0.05.

5. The ink jet textile printing penetrant according to claim 1,
wherein the water-soluble organic solvent is in a range of 10 mass % or more with respect to a total amount of the ink jet textile printing penetrant.

6. An ink jet recording apparatus comprising:
the ink jet textile printing penetrant according to claim 1.

7. An ink jet recording apparatus comprising:
the ink jet textile printing penetrant according to claim 2.

8. An ink jet recording apparatus comprising:
the ink jet textile printing penetrant according to claim 3.

9. An ink jet recording apparatus comprising:
the ink jet textile printing penetrant according to claim 4.

10. An ink jet recording apparatus comprising:
the ink jet textile printing penetrant according to claim 5.

* * * * *